US005460885A

United States Patent [19]

Chu-Ba

[11] Patent Number: 5,460,885

[45] Date of Patent: Oct. 24, 1995

[54] INSULATED ELECTRICAL PRODUCTS AND PROCESSES OF FORMING SUCH PRODUCTS

[75] Inventor: Cao Chu-Ba, Plano, Tex.

[73] Assignee: General Cable Industries, Inc., Highland Heights, Ky.

[21] Appl. No.: 483,087

[22] Filed: Feb. 21, 1990

[51] Int. Cl.$^{6}$ .............................. B32B 27/00; D02G 3/00

[52] U.S. Cl. ...................... 428/383; 428/379; 174/110 V; 174/110 SR; 174/120 SR

[58] Field of Search .................................... 428/379, 383; 174/120 SR

[56] References Cited

U.S. PATENT DOCUMENTS

| | | | |
|---|---|---|---|
| 3,022,200 | 2/1962 | Koerner et al. | 428/383 |
| 3,201,276 | 8/1965 | Meyer et al. | 428/383 |
| 4,154,892 | 5/1979 | Glatti et al. | 428/379 |
| 4,584,241 | 4/1986 | Choi et al. | 428/379 |
| 4,806,425 | 2/1989 | Chu-Ba | 428/379 |

OTHER PUBLICATIONS

Touchette, N. W. et al., "Plasticizers", *Encyclopedia of Physical Science and Technology,* vol. 10, 1987, pp. 753–768.

Chapter 17, *Encyclopedia of PVC,* Nass, L. I., Editor, Marcell Decker, Inc., 1976, pp. 847–880.

Chapter 23, *Encyclopedia of PVC,* Nass, L. I., Editor, Marcell Decker, Inc., 1976, pp. 1298–1301.

*Kirk–Othmer Encyclopedia of Chemical Technology,* 3rd Ed., 1982, John Wiley & Sons, vol. 18, "Plastics Processing", pp. 194–199.

Bias, D. C. et al., "Polyvinyl Chloride—The Function of Plasticizers and Fillers in High Performance Electrical Compounds", *Division of Organic Coatings and Plastic Chemistry,* Nov. 30–Dec. 5, 1975, Mexico City.

Thinius et al., "Vapor Pressure Measurement of Plasticizers and Mixtures of Plasticizers", *Plaste Kautschuk,* Dec. 5, 1965, pp. 265–270, with English language translation by Dr. Paula Raizman, pp. 1–17.

*Primary Examiner*—Patrick J. Ryan
*Assistant Examiner*—J. M. Gray
*Attorney, Agent, or Firm*—Frost & Jacobs

[57] ABSTRACT

A high service temperature electrical wiring product comprising a jacketed polyvinyl chloride insulation incorporating a relatively volatile plasticizing system and manufacturing process therefor. The wiring product comprises an electrical conductor and an insulation covering on the conductor having a UL-83 service temperature classification of at least 90° C. The insulation is formed of a primary coating of a polyvinyl chloride resin which contains a relatively volatile plasticizing system for the resin, specifically, one having a vapor pressure at 200° C. of at least 0.3 torr. A jacket surrounding the primary insulation coating is formed of a poly (alkylene terephthalate) having a melt temperature in excess of that of the primary insulation coating. A specific plasticizer system is an organic acid ester plasticizing system in which the predominant ester component is a di (R, R') phthalate ester in which R and R' are each independently an alkyl group and which together contain a total of no more than 20 carbon atoms. Such a system comprises a mixture of a predominant dialkyl phthalate, in which each alkyl group contains from 8–10 carbon atoms, and a minor amount of a dibasic aliphatic acid ester.

18 Claims, No Drawings

INSULATED ELECTRICAL PRODUCTS AND PROCESSES OF FORMING SUCH PRODUCTS

TECHNICAL FIELD

This invention relates to insulated electrical products and more particularly to jacketed high temperature wiring products and methods of formulating such products.

BACKGROUND OF THE INVENTION

Plasticizers are used in polyvinyl chloride insulation for electrical wiring. The plasticizers are used both as processing aids during handling of the polyvinyl chloride resin formulation and its extrusion onto the electrical wire and also as end-use modifiers where they affect the chemical and/or physical characteristics of the insulation on the final product.

While many types of plasticizers are used in polyvinyl chloride insulation covering on electrical wires and cables, the most widely used plasticizers are esters of polybasic organic acids, especially polybasic aromatic acid esters. These plasticizers are the reaction products of aliphatic alcohols with polybasic aromatic acids, principally phthalic acid and trimellitic acid.

Other dibasic acid ester plasticizers are based upon aliphatic acid esters such as esters of adipic, glutaric, pimelic, azelaic, suberic and sebacic acids. Examples of esters of dibasic aliphatic acids used as plasticizers include dioctyl adipate, particularly di-2-ethylhexyl adipate, di-heptyl, nonyl adipate, and di-isononyl adipate. Other such alphatic acid esters used include dioctyazelate, specifically di-2-ethylhexyl azelate and dioctyl sebacate, specifically di-2-ethylhexyl sebacate. Phosphate plasticizers are sometimes also used in polyvinyl chloride insulation. Examples of such plasticizers are isodecyl diphenyl phosphate, isopropylphenyl diphenyl phosphate, 2-ethylhexyl diphenyl phosphate, and tri-2-ethylhexyl phosphate.

The amount and nature of the plasticizers in polyvinyl chloride formulations are dictated in part by the service temperature classification of the wiring product and the thickness of the polyvinyl chloride insulation. In general, higher service temperature classifications require lower volatility (usually higher molecular weight) plasticizer systems. A similar relationship obtains for the thickness of the polyvinyl chloride insulation. Usually a decrease in the thickness of the polyvinyl chloride insulation dictates the need to use a somewhat lower volatility plasticizer system.

The most widely used of the polybasic aromatic acid esters are dialkyl phthalates, examples of which include di-2-ethylhexyl phthalate (DOP), di-isooctyl phthalate (DIOP), di-isodecyl phthalate (DIDP), di-N-octyl, N-decyl phthalate (DNODP), and di-tridecyl phthalate (DTDP). The aforementioned phthalatic acid based plasticizers are conventionally used in low to moderate temperature applications. However, in high temperature wiring applications, e.g., UL-83 90° C. and 105° C. wiring, it is a conventional practice to use plasticizer systems composed of substantial amounts of trimellitate esters. The trimellitate esters are of low volatility and considered to be more stable to oxidation loss from the polyvinyl chloride resin formulation and thus, more suitable for use in high temperature environments. Trimellitic acid based plasticizers include tri(octyl) trimellitate (TOTM), tri(isooctyl) trimellitate (TIOTM), N-octyl, N-decyl trimellitate and tri(isononyl) trimellitate (TINTM).

It is a conventional practice to provide relatively thin polyvinyl chloride insulation on electrical conductors and to surround the PVC insulation with a jacket. Jacketed conductors such as type-THHN and type-TNWN wiring products are provided with PVC insulation surrounded by a nylon jacket. Depending upon the gauge of the wire, the average thickness of the polyvinyl chloride insulation may range from about 15–20 mils with the thickness of the nylon jacket being about 4–5 mils.

While nylon has usually been the jacketing material of choice in high temperature (90° C. or 105° C.) thin wall-type jacketed wiring products, it is also been proposed to use poly (alkylene terephthalate) for this purpose. A specific jacketing material of this type is poly (butylene terephthalate) available from General Electric Company under the designation VALOX.

The plasticizers used in such jacketed thin wall-type wiring products are, consistent with the protocals described previously, of a relatively low volatility. As described in Touchette, N. W. et al. "Plasticizers" *Encyclopedia of Physical Science and Technology,* Vol. 10, 1987, plasticizer volatility can be characterized in various ways such as in terms of vapor pressure or percent weight loss from plasticized PVC under controlled conditions. A common expedient for characterizing plasticizer volatility is vapor pressure of the plasticizer at 200° C. Plasticizers conventionally used in jacketed thin wall-type wiring products of the type described previously typically have a vapor pressure at 200° C. of less than 0.2 torr (0.2 millimeters of mercury). For example, a low volatility plasticizer formulation used in jacketed wiring products having a surface temperature classification of at least 90° C., is one containing at least 20 percent of a trimellatate plasticizer, e.g., TOTM in admixture with up to 80 percent of relatively high molecular weight phthalate such as dinundecyl phthalate (DUP). DUP has a vapor pressure of 0.2 torr at 200° C., whereas the trimellatate plasticizer typically will have a 200° C. vapor pressure of about 0.05 torr, resulting in an average vapor pressure for the formulation of less than 0.2 torr, specifically about 0.17 torr.

In addition to containing plasticizers, polyvinyl chloride insulations will normally contain stabilizers to retard degradation of the PVC during processing and during use, antioxidants and fillers. The stabilizers may be either organic, or inorganic, or combinations of both. The antioxidants are added in order to prevent oxidative degradation of the plasticizer and also the polyvinyl chloride resin. The antioxidants normally employed in formulating PVC insulation are sterically hindered phenols. Bisphenol A (BPA) is the most widely used. Bisphenol A normally is employed in PVC formulations in only very small amounts, usually substantially less than one weight percent based on the amount of plasticizer in the formulation. However, U.S. Pat. No. 4,806,425 to Chu-Ba discloses the use of relatively high concentrations of bisphenol A in conjunction with certain phthalate esters in formulating insulation coverings having service temperature classifications of at least 90° C. Here, the bisphenol A is employed in an amount of at least 1.5 weight percent based upon the amount of polybasic aromatic acid ester plasticizing system in the insulating material. Topanol CA can also be used as an antioxidant as described in U.S. Pat. No. 4,806,425. Topanol CA is a substantially stronger antioxidant than bisphenol A and can be employed in an amount of about ⅓th of the amount of bisphenol A to achieve equivalent results.

SUMMARY OF THE INVENTION

In accordance with the present invention there is provided a new high temperature electrical wiring product comprising a jacketed polyvinyl chloride insulation incorporating a relatively volatile plasticizing system and processes for manufacturing such products. The insulated wiring product of the present invention comprises an electrical conductor and an insulation covering in the conductor having a UL-83 service temperature classification of at least 90° C. The insulation is formed of a primary coating of a polyvinyl chloride resin which contains a relatively volatile plasticizing system for the resin. The plasticizing system has a vapor pressure at 200° C. of at least 0.3 torr (0.3 mm Hg.). A jacket surrounding the primary insulation coating is formed of a poly (alkylene terephthalate) having a melting point in excess of the primary insulation coating. Preferably, the plasticizer system for the resin has a vapor pressure of at least 0.5 torr and more specifically, a vapor pressure within the range of 0.5–1.5 torr.

A specific plasticizer system employed in a preferred embodiment of the invention is an organic acid ester plasticizing system in which the predominant ester component is a di (R, R') phthalate ester in which R and R' are each independently an alkyl group. The alkyl groups contain a total of no more than 20 carbon atoms. A preferred plasticizing system is one comprising a mixture of a predominant dialkyl phthalate, in which each alkyl group contains from 8–10 carbon atoms and a minor amount of a dibasic aliphatic acid ester. A specific plasticizing system of this type contains diisodecyl phthalate as the predominant component and diisononyl adipate as a minor component.

In carrying out the process of the present invention there is provided a hot melt of a polyvinyl chloride resin containing a volatile plasticizing system having a vapor pressure at 200° C. of at least 0.3 torr (0.3 mm Hg.). Also provided is a hot melt of a poly (alkylene terephthalate) having a melt temperature greater than the melt temperature of the polyvinyl chloride resin. The polyvinyl chloride resin hot melt is formed on the electrical conductor to provide a primary insulation coating. This is followed by forming the poly (alkylene terephthalate) hot melt onto the polyvinyl chloride resin coated conductor to provide a jacket surrounding the primary insulation coating. The jacket thickness is relatively thin in comparison with the primary insulation coating. Specifically, the primary insulation coating is applied to provide a thickness of at least about 15 mils and the poly (alkylene terephthalate) is formed onto the polyvinyl chloride resin coated conductor to provide a jacket thickness of less than one-half the thickness of the primary insulation coating. Normally, the jacket material is applied immediately after the polyvinyl chloride resin so that it is formed on the conductor before the polyvinyl chloride resin has solidified.

DETAILED DESCRIPTION OF THE INVENTION

In the production of insulated electrical wiring products, a hot melt of polyvinyl chloride is formulated by appropriate compounding techniques and applied to provide an insulation coating on an electrical conduit such as copper or aluminum wire or the like. Components which may be used in the formulation procedure normally include; in addition to the polyvinyl chloride resin, plasticizer systems, and antioxidants discussed above; stabilizers, lubricants, fillers and colorants. Techniques and materials which are commonly employed in the formulation of plasticized polyvinyl chloride compounds and the effects of the various components upon product properties and processing parameters are disclosed in Chapter 17 of Encyclopedia of PVC, Nass, L. I., Editor, Marcell Decker, Inc., 1976, Pages 847–880, the disclosure which is incorporated herein by reference.

After producing the polyvinyl chloride hot melt, it is formed on the electrical conductor by any suitable technique such as those involved in the well-known extrusion procedures. In a typical extrusion procedure, the conductor wire is straightened, optionally heated, and then passed through an extrusion die where the polyvinyl hot melt is applied to the wire. In the production of jacketed wiring products of the type to which the present invention pertains, a hot melt of the jacket material is applied to the coated wire through a second extrusion die located immediately downstream of the extrusion die for the polyvinyl chloride. In the extrusion process, the wire passes through the extrusion dies at speeds normally ranging from about 500 to 5,000 feet per minute, and usually about 2,000 to 5,000 feet per minute. The dies are located in relatively close proximity to one another, for example, about 5–20 feet apart and more specifically, about 10 to 20 feet apart. Thus, the time between the two extrusion procedures is normally only a fraction of a second; usually about one-eighth to about one-half of a second. After passing through the primary and secondary extrusion dies, the coated wire product is cooled, for example, by passage through a water trough, and then spooled for storage and shipping. Extrusion of the hot melts on to the wire may be accomplishesd by any suitable technique, and for a further description of extrusion procedures, reference is made to Chapter 23, Pages 1298– 1301 of the aforementioned Encyclopedia of PVC by Nass and to Kirk-Othmer, *Enclyclopedia of Chemical Technology,* Third Edition, 1982, John Wiley & Sons, Volume 18, Plastics Processing, Pages 194–199; the disclosures of which are incorporated herein by reference.

As noted previously, jacketed wiring products designed for high service temperatures are characterized by PVC plasticizing systems of low volatility in order to satisfy service temperature requirements prescribed by Underwriter's Laboratory. Underwriter's Laboratory Standards, described in greater detail below, for jacketed 90° C. and 105° C. wires involve aging tests carried out at 136° C. in an air circulation oven over a period of seven days.

In contrast to the prior art practices which have dictated the use of the low volatility, high molecular weight, and more expensive, phthalates and trimellitates for the high service temperature wiring products, the present invention involves the use of higher volatility plasticizers for such high service temperature applications through the use of a poly (alkylene terephthalate) jacket surrounding the primary PVC insulation coating. The higher volatility plasticizer systems used in the present invention are of a relatively low average molecular weight and provide for substantial savings in the production of the jacketed wiring product, resulting in a lower ultimate cost of the final product. By way of example and as described in greater detail below, a high volatility plasticizer system (a mixture of 85 weight percent di-isodecyl phthalate and 15 weight percent diisononyl adipate) employed in the present invention, shows very little weight loss. Thus, when using the above-described plasticizer system in a PVC insulation having a nominal thickness of 15 mils and provided with a poly (butylene terephthalate) jacket of 5 mils in accordance with the present invention, the weight loss after aging at 136° C. for 7 days, is about 2 percent. For the same product, but with the PVC insulation only (no jacket), the weight loss after aging at 136° C. for 7 days, is about 10 weight percent.

While applicant's invention is not to be limited by theory, it is believed that a chemical bonding between the polyvinyl chloride resin and the poly (alkylene terephthalate) jacket material occuring during the manufacturing process, acts to help prevent the more volatile plasticizers from escaping from the polyvinyl chloride primary insulation during high temperature conditions. This is confirmed by experimental work which shows little or no migration of the plasticizing system across the polyvinyl chloride-poly (alkylene terephthalate) boundary into the jacketing material.

The insulation covering of the present invention has a service temperature classification of at least 90° C. as determined by standard testing procedures modified as described below. The testing procedures follow those set forth in UL-83, "Standard for Thermoplastic-Insulated Wires and Cables" Underwriter's Laboratory, Inc., 8th Edition, Oct. 15, 1980. The standard aging test involves aging a specimen in an air circulation oven at 136° C. for seven days. The physical properties of the specimens measured at the conclusion of the aging period are required to meet certain retention parameters as specified in UL-83, Table 14.1. Specifically, the minimum acceptable retention of tensile strength is 75 percent of the result measured for the unaged specimen. The minimum acceptable retention of elongation is 65 percent of the result obtained with unaged specimens. The testing procedures specified in UL-83 are modified to permit the use of specimens with the primary polyvinyl chloride insulation and the jacketing material in place. A six inch specimen of the wiring product is obtained. The conductor is withdrawn from the insulation material to leave a specimen comprising a tubular form of the polyvinyl chloride resin surrounded by the jacketing material with the ends open so that the interior circumference of the PVC insulation, originally in proximity to the conductor, is open to air in the aging oven. The specimen is supported vertically in the circulating air oven and aged for 168 hours at 136 ° C. as specified in UL-83, Table 14.1.

As noted previously, a wide variety of plasticizers may be used in formulating polyvinyl chloride based insulating materials. The plasticizers perform a number of functions including modification of the physical properties of the polyvinyl chloride resin which, in itself, is a hard brittle material showing very little flexibility. The addition of the plasticizers results in a final product which shows good properties in flexibility and extensibility to render it suitable for use in insulation. Plasticizers suitable for use in polyvinyl chloride based insulation materials are described in the aforementioned Touchette, N. W. et al. article "Plasticizers" *Encyclopedia of Physical Science and Technology,* Vol. 10, 1987, and in Bias, C. D. et al., "Polyvinyl Chloride—The Function of Plasticizers and Fillers in High Performance Electrical Compounds", Division of Organic Coatings and Plastic Chemistry, American Chemical Society, First Chemical Congress, Nov. 30–Dec. 5, 1975, Mexico City, the entire disclosures of which are incorporated herein by reference.

The desirable qualities of workability and flexibility of the insulation material are generally found to be in a direct relationship with the amount of plasticizers present. The plasticizers may be characterized as being present in the polyvinyl chloride as a physical admixture as contrasted with chemical bonding. Thus, the plasticizers are subject to loss from the insulation material and as the plasticizer content is reduced, the insulation material progressively becomes more brittle and unsuitable for use as an insulation. As described in the aforementioned articles by Touchette et al. and Bias et al., the volatility of the plasticizers is an important parameter determining the amount and rate of loss of plasticizer from the insulation system. Put simply, the accepted relationship is the more extreme the conditions to which the insulation is to be exposed, the less volatile the plasticizer system should be.

Plasticizer volatility depends upon a number of factors. In general, the volatility of a plasticizer decreases as its molecular weight increases. Plasticizers incorporating linear organic chains such as alkyl groups and the like are generally less volatile than the corresponding isomers which are highly branched. While plasticizer volatility can be characterized in terms of a number of physical properties, a convenient characteristic as described in the aforementioned article by Touchette et al., is vapor pressure measured at 200° C.

The present invention proceeds in a manner contrary to prior art teachings in providing, in conjunction with the use of poly (alkylene terephthalate) jacketing material, relatively volatile plasticizing systems for the polyvinyl chloride resin. Specifically, the plasticizing systems used in the present invention have a vapor pressure at 200° C. of at least 0.3 torr (0.3 mm Hg). This is substantially higher than the vapor pressure of the lower volatility plasticizers normally used in formulating jacketed polyvinyl chloride insulation materials.

Poly (alkylene terephthalates) are well known thermoplastic polyester resins. Such resins have a wide variety of applications, ranging from uses in clothing and other fabrics to packaging applications such as packaging films and containers. Commonly available poly (alkylene terephthalates) include poly (ethylene terephthalate) and poly (butylene terephthalate). These resins have melt temperatures ranging from about 245°– 265° C. for poly (ethylene terephthalate) homopolymer and about 238°– 266° C. for poly (butylene terephthalate) homopolymer. They can readily be extruded at temperatures ranging from about 227° to 283° C. By way of a suitable example, poly (butylene terephthalate) is commercially available from General Electric Company as VALOX 317 Resin. This resin has a melt temperature of about 249° C. and an extrusion temperature range of about 249° to 272° C. However, other poly (alkylene terephthalates) can be used in carrying out the invention so long as they have a melt temperature greater than the melt temperature of the polyvinyl chloride resin applied to the conductor and are extrudable at temperatures that are not excessively high. As a practical matter, it is desirable to extrude the poly (alkylene terephthalate) at a temperature of about 272° C. or less. The extrusion temperature of the poly (alkylene terephthalates) should be greater than the extrusion temperature of the polyvinyl chloride, which normally will be within the range of about 174° to 185° C. Preferably, the extrusion temperature of the poly (alkylene terephthalate) is greater by about 60° to 90° C., more specifically, 75° to 90° C., than the extrusion temperature of the polyvinyl chloride.

More volatile plasticizers having 200° C. vapor pressures of 0.5 torr or above can be used in accordance with the present invention. Examples include DINP (diisononyl phthalate) and DHNUP, described below, having 200° C. vapor pressures of 0.5 and 0.6 torr, respectively. Other commonly available phthalate esters of even greater volatility can be employed in carrying out the invention. Plasticizer vapor pressures of up to 1.5 torr can be designated, thus permitting the use of dioctyl phthalate having a 200° C. vapor pressure of 1.3 torr, and di-2-ethylhexyl terephthalate, having a 200° C. vapor pressure of 1.2 torr. However, the use of such high volatility plasticizers will usually not offer significant economic advantages over the slightly less volatile plasticizers, and accordingly a practical upper limit for plasticizer volatility will be about 1.0 torr at 200° C.

Esters of polybasic organic acids are the most widely used plasticizers in formulating insulating materials, with those derived from aromatic acids predominating. Both trimellitate and phthalate esters are conventionally employed as plasticizers in polyvinyl chloride insulation for electrical products. The phthalic acid esters are substantially cheaper than the trimellitates and for this reason alone often are preferred for use in polyvinyl chloride formulations. Phthalic acid esters of relatively low molecular weight are widely used in the low to moderate temperature wiring products, e.g., those having service temperatures of 60° C. and 75° C.

A mixture of $C_7$–$C_{11}$ phthalates, di (heptyl, nononyl, (undecyl) phthalate, commonly abbreviated DHNUP having an average molecular weight of 414 and a vapor pressure of 0.6 torr at 200° C.; can be used to plasticize polyvinyl chloride where the service temperature classification is 60° C. A typical formulation for 75° C. polyvinyl chloride insulation incorporates a plasticizer system comprising equal amounts of DHNUP and diundecyl phthalate. This system has an average vapor pressure of 0.4 torr based upon a vapor pressure of 0.2 torr for the DUP and a vapor pressure of 0.6 torr for DHNUP.

The trimellitate esters and the high molecular weight phthalates such as ditridecyl phthalate, (DTDP) or mixtures of DTDP with DUP, are used in the higher service temperature classification materials because of their increased stability and resistence to oxidation. The trimellitates and high molecular phthalates such as DTDP have 200° C. vapor pressures of about 0.1 torr or below.

Minor amounts of the trimellitate esters or the high molecular weight phthalates can be used in plasticizer formulations employed in the present invention although they are unnecessary. Where mixtures of high volatility and low volatility plasticizers are used, the vapor pressure for the overall plasticizer system will be taken for the purposes of this invention, as the arithmetic average of the vapor pressures of the plasticizer components involved based upon the relative amounts of plasticizer components. Thus, a plasticizer system containing equal amounts of DUP and DHNUP will, as described above, be considered to have a vapor pressure of 0.4 torr. Similarly, the system comprising a mixture of 85 wt. % diisodecyl phthalate (0.35 torr) and 15 wt. % diisonoyl adipate (1.4 torr) will be taken to have an average vapor pressure of 0.51 torr as indicated by the following calculation: $0.85\times0.35$ torr$+0.15\times1.4$ torr$=0.51$ torr.

As indicated by Thinius et al., "Vapor Pressure Measurement of Plasticizers and Mixtures of Plasticizers" Plaste Kautschuk, 12-5-65, pp. 265–279, at a temperature of about 200° C., the vapor pressures for binary mixtures of plasticizers vary in an approximately linear relationship. To the extent the actual vapor pressure of a binary mixture departs from that predicted by the arithmetic average, the actual vapor pressure would appear to be slightly higher than the arithmetic average as shown by the relationships set forth in FIG. 10 of Thinius. Thus, the average vapor pressure of a mixture arrived at by means of an arithmetic average may actually be somewhat conservative, that is slightly lower than the actual measured vapor pressure.

The thickness of the poly (alkylene terephthalate) jacket is dictated to some extent by the thickness of the primary coating of polyvinyl chloride. As noted previously, the poly (alkylene terephthalate) jacket should have a thickness less than one-half the thickness of the polyvinyl chloride. For most applications, the thickness of the jacketing material should be 40% the thickness of the polyvinyl chloride insulation. Normally the polyvinyl chloride will have an average thickness within the range of 15–22 mils and the jacketing material a thickness within the range of 4–6 mils. The apparent optimum thickness of the jacketing material appears to vary somewhat with the thickness of the polyvinyl chloride insulation. For PVC insulation of 15–16 mils thick, a poly (butylene terephthalate) jacket of a thickness of 4–6 mils provided good results. However, a jacket 8 mils thick failed the 7-day, 136° C. aging test. For polyvinyl chloride insulation 18 mils thick, poly (butylene terephthalate) jackets of 4–6 mils passed the aging studies, although the best results were obtained with a jacket thickness of 5 mils. At a primary insulation thickness of 21 mils, satisfactory results were achieved after aging with poly (butylene terephthalate) thicknesses of 4 and 6 mils.

In experimental work respecting the invention, three plasticizers were employed in formulating polyvinyl chloride resins which were extruded onto a 12-gauge wire, followed by extrusion of poly (butylene terephthalate). The average thickness of the polyvinyl chloride was about 15–16 mils. The average thickness of the poly (butylene terephthalate) was 4–5 mils. The three plasticizers used were DIDP (diisodecyl phthalate), DUP (diundecyl phthalate), and the 85%–15% blend of DIDP and DINA as described previously. The polyvinyl chloride formulations are indicated in Table I.

TABLE I

| INGREDIENT | PHR | PHR | PHR |
|---|---|---|---|
| PVC | 100 | 100 | 100 |
| Clay | 8 | 8 | 8 |
| Calcium Carbonate | 10 | 10 | 10 |
| Tribasic Lead Sulfate | 3 | 3 | 3 |
| Dibasic Lead Sulfate | 4 | 4 | 4 |
| Antimony Trioxide | 2 | 2 | 2 |
| Diisodecyl Phthalate | 48 | | |
| Diundecyl Phthalate | | 46 | |
| 85% DIDP and 15% DINA | | | 48 |
| Epoxidized Soybean Oil | 2 | 2 | 2 |
| Fatty Acid Ester | .5 | .5 | .5 |
| Bisphenol A | .7 | .7 | .7 |

The three formulations were extruded using the same extruder at the same line speed (3000 ft. per min.) with the insulation and jacket extruders located about 15 feet apart. The extrusion temperature for the polyvinyl chloride was about 185 ° C.; for the poly (butylene phthalate) about 265° C. The results before and after aging of the samples at 136° C. for 168 hours following the UL-83 protocol modified as described above, are set forth in Table II.

TABLE II

| Physical Properties | | | | | | |
|---|---|---|---|---|---|---|
| Original | | After Aging | | | | |
| Ten | Elong | Ten | Elong | Retention, % | | |
| Str, PSI | at Break, % | Str, PSI | at Break, % | Ten Str | Elong | Plast. |
| 3598 | 289 | 3466 | 238 | 96 | 82 | DUP |
| 3577 | 277 | 3576 | 222 | 100 | 80 | DIDP |

TABLE II-continued

| Physical Properties | | | | | | |
|---|---|---|---|---|---|---|
| Original | | After Aging | | Retention, % | | |
| Ten Str, PSI | Elong at Break, % | Ten Str, PSI | Elong at Break, % | Ten Str | Elong | Plast. |
| 3547 | 290 | 3429 | 232 | 96 | 80 | DIDP,DINA |

As can be seen from an examination of Table II, the high volatility plasticizers incorporated in accordance with the present invention, the DIDP and DIDP-DINA mixture, showed results in terms of retention of elongation and retention of tensile strength which are comparable to the results obtained for the formulated containing the lower volatility plasticizer, DUP. The poly (alkylene terephthalate) jacket clearly helps to retain the high volatility plasticizers within the insulation formulation so that they behave effectively in the same manner as the lower volatility plasticizer.

Having described specific embodiments of the present invention, it will be understood that modifications thereof may be suggested to those skilled in the art, and it is intended to cover all such modifications as fall within the scope of the appended claims.

I claim:

1. In an insulated electrical wiring product having a service temperature classification of at least 90° C., the combination comprising:

(a) an electrical conductor, and (b) an insulation covering on said conductor having a UL-83 service temperature classification of at least 90 ° C. formed of a primary coating surrounding said conductor and formulated of a polyvinyl chloride resin containing a volatile plasticizing system for said resin having a vapor pressure at 200° C. of at least 0.3 torr and, a jacket surrounding said primary insulation coating and formulated of a poly (alkylene terephthalate) having a melt temperature in excess of the melt temperature of said primary insulation coating.

2. The wiring product of claim 1 wherein said primary polyvinyl chloride coating has an average thickness within the range of 15–22 mils and said jacket has an average thickness within the range of 4–6 mils.

3. The wiring product of claim 2 wherein said primary polyvinyl chloride coating has an average thickness within the range of 16–20 mils.

4. The wiring product of claim 2 wherein said primary polyvinyl chloride coating has an average thickness in the range of 16–18 mils.

5. The wiring product of claim 4 wherein said jacket has an average thickness of about 5 mils.

6. The wiring product of claim 2 wherein said plasticizing system for said resin has a vapor pressure at 200° C. within the range of 0.5–1.5 torr.

7. The wiring product of claim 6 wherein said plasticizing system for said resin has a vapor pressure at 200° C. within the range 0.3–1.0 torr.

8. The wiring product of claim 1 wherein said jacket is formulated of a poly (butylene terephthalate).

9. The wiring product of claim 8 wherein said primary polyvinyl chloride coating has an average thickness within the range of 15–22 mils and said jacket has an average thickness within the range of 4–6 mils.

10. The wiring product of claim 9 wherein said plasticizing system for said polyvinyl chloride resin has a vapor pressure within the range of 0.5–1.5 torr.

11. The wiring product of claim 8 wherein the plasticizing system for said polyvinyl chloride resin has a vapor pressure at 200° C. of at least 0.5 torr.

12. The wiring product of claim 1 wherein said plasticizing system for said resin comprises a mixture of a dibasic aromatic acid ester and a dibasic aliphatic acid ester.

13. The wiring product of claim 12 wherein said dibasic aromatic acid ester is a dialkyl phthalate ester in which the alkyl groups contain a total of no more than 20 carbon atoms.

14. The wiring product of claim 13 wherein said jacket is formulated of a poly (butylene terephthalate).

15. In an insulated electrical wiring product having a surface temperature classification of at least 90° C., the combination comprising:

(a) an electrical conductor, and (b) an insulation covering on said conductor having a UL-83 service temperature classification of at least 90 ° C. formed of a primary coating surrounding said conductor and formulated of a polyvinyl chloride resin containing an organic acid ester plasticizing system in which the predominate ester component is a di (R, R') phthalate ester wherein R and R' are each independently an alkyl group, said alkyl groups containing a total of no more than 20 carbon atoms, and a jacket surrounding said primary insulation coating and formulated of a poly(alkylene terephthalate) having a melt temperature in excess of the melt temperature of said primary insulation coating.

16. The wiring product of claim 15 wherein R and R' each contain from 8–10 carbon atoms.

17. The wiring product of claim 16 wherein said plasticizing system comprises a minor amount of a dibasic aliphatic acid ester.

18. The wiring product of claim 17 wherein said plasticizing system comprises a mixture of diisodecyl phthlate and diisononyl adipate.

* * * * *